(12) United States Patent
Velikovich et al.

(10) Patent No.: US 11,797,772 B2
(45) Date of Patent: *Oct. 24, 2023

(54) WORD LATTICE AUGMENTATION FOR AUTOMATIC SPEECH RECOGNITION

(71) Applicant: GOOGLE LLC, Mountain View, CA (US)

(72) Inventors: Leonid Velikovich, New York, NY (US); Petar Aleksic, Jersey City, NJ (US); Pedro Moreno, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,186

(22) Filed: Jan. 31, 2022

(65) Prior Publication Data

US 2022/0229992 A1    Jul. 21, 2022

Related U.S. Application Data

(63) Continuation of application No. 16/622,657, filed as application No. PCT/US2019/039531 on Jun. 27, 2019, now Pat. No. 11,238,227.

(60) Provisional application No. 62/864,344, filed on Jun. 20, 2019.

(51) Int. Cl.
| | |
|---|---|
| *G10L 15/22* | (2006.01) |
| *G10L 15/187* | (2013.01) |
| *G06F 40/295* | (2020.01) |
| *G06F 40/30* | (2020.01) |
| *G10L 15/06* | (2013.01) |

(52) U.S. Cl.
CPC ............ *G06F 40/295* (2020.01); *G06F 40/30* (2020.01); *G10L 15/063* (2013.01); *G10L 15/187* (2013.01); *G10L 15/22* (2013.01)

(58) Field of Classification Search
CPC ................................ G10L 15/22; G10L 15/26
See application file for complete search history.

(56) References Cited

U.S. PATENT DOCUMENTS

| | | |
|---|---|---|
| 8,924,212 B1 | 12/2014 | Allauzen |
| 8,972,243 B1 | 3/2015 | Strom et al. |
| 11,238,227 B2 | 2/2022 | Velikovich et al. |

(Continued)

FOREIGN PATENT DOCUMENTS

| | | |
|---|---|---|
| CN | 102682763 | 9/2012 |

OTHER PUBLICATIONS

Meksic et al., "Bringing contextual information to google speech recognition," in INTERSPEECH. 2015.

(Continued)

*Primary Examiner* — Jialong He
(74) *Attorney, Agent, or Firm* — Gray Ice Higdon

(57) ABSTRACT

Speech processing techniques are disclosed that enable determining a text representation of named entities in captured audio data. Various implementations include determining the location of a carrier phrase in a word lattice representation of the captured audio data, where the carrier phrase provides an indication of a named entity. Additional or alternative implementations include matching a candidate named entity with the portion of the word lattice, and augmenting the word lattice with the matched candidate named entity.

18 Claims, 11 Drawing Sheets

(56) References Cited

U.S. PATENT DOCUMENTS

| | | | |
|---|---|---|---|
| 2003/0009335 A1 | 1/2003 | Schalkwyk et al. | |
| 2003/0191625 A1 | 10/2003 | Gorin et al. | |
| 2005/0125220 A1* | 6/2005 | Kim | G06F 40/242 704/10 |
| 2012/0203776 A1* | 8/2012 | Nissan | G06F 16/685 707/E17.014 |
| 2012/0232904 A1* | 9/2012 | Zhu | G10L 15/22 704/E15.005 |
| 2015/0279358 A1* | 10/2015 | Kingsbury | G10L 15/02 704/257 |
| 2017/0186432 A1 | 6/2017 | Meksic et al. | |
| 2018/0366112 A1 | 12/2018 | Aleksic et al. | |

OTHER PUBLICATIONS

Hall et al., "Composition-based-n-the-fly rescoring for salient n-gram biasing" INTERSPEECH, 2015.

Parada et al., "OOV sensitive named-entity recognition in speech" INTERSPEECH, 2011. pp. 2085-2088.

J. Wells, "Computer-coding the ipa: a proposed extension of sampa" 1995. 18 pages.

M. Mohri, "Edit-distance of weighted automata: General definitions and algorithms," International Journal of Foundations of Computer Science, vol. 14, No. 06, pp. 957-982,2003. Retrieved from https://doi.org/10.1142/S0129054103002114.

Oord et al., "Wavenet: A generative model for raw audio." arXiv:1609.03499v2 [cs.SD]. Dated Sep. 19, 2016.

Michaely et al., "Unsupervised context learning for speech recognition" Spoken Language Technology (SLT) Workshop. 2016.

Mohri et al., "Weighted Finite-State Transducers in Speech Recognition" Computer Speech & Language. Vol. 16, Issue 1. 2001.

Chiu et al., "State-of-the-Art Speech Recognition with Sequence-to-Sequence Models" arXiv:1712.01769v6 [cs.CL]. Dated Feb. 23, 2018.

Scheiner et al., "Voice Search Language Model Adaptation Using Contextual Information" IEEE Spoken Language Technology Workshop (SLT). 2016. pp. 253-257.

Vasserman et al., "Contextual Language Model Adaptation Using Dynamic Classes" IEEE. Spoken Language Technology Workshop (SLT). 2016. 441-446.

Aleksic et al., "Improved Recognition of Contact Names in Voice Commands" 2015. IEEE. International Conference on Acoustics, Speech and Signal Processing (ICASSP). Apr. 2015. pp. 5172-5175.

Saon et al., "Anatomy of an Extremely Fast LVCSR Decoder" IEEE. 2005. Retreived from https://www.microsoft.com/en-us/research/uploads/prod/2005/01/Anatomy-of-an-Extremely-Fast-LVCSR-Decoder.

Aleksic, Petar et al.; Improved Recognition of Contact Names in Voice Commands; IEEE International Conference on Acoustics; Speech and Signal Processing (ICASSP); dated 2015.

Novak, Josef R. et al.; Dynamic Grammars with Lookahead Composition for WFST based speech recognition; 13th Annual Conference of the International Speech Communication Association; dated 2012.

Can, Dogan et al.; Effect of Pronounciations on OOV Queries in Spoken Term Detection; IEEE International Conference on Acoustics, Speech and Signal Processing; dated 2009.

Velikovich, L. et al., "Semantic Lattice Processing in Contextual Automatic Speech Recognition for Google Assistant;" Interspeech 2018; pp. 2222-2226; 2018.

Saon, G. et al., "Anatomy of an extremely fast LVCSR decoder;" Interspeech 2005; retrieved from internet: URL:https://pdfs.semanticscholar.org/4993/485330a0a847e6a500dfef47060c5cebe2ac.pdf; pp. 549-552; 2005.

Serrino, J. et al., "Contextual Recovery of Out-of-Lattice Named Entities in Automatic Speech Recognition;" Interspeech 2019; pp. 3830-3834; Sep. 15, 2019.

European Patent Office; International Search Report and Written Opinion of Ser. No. PCT/US2019/039531; 16 pages; dated Jan. 28, 2020.

European Patent Office; Communication pursuant to Article 94(3) EPC issued in Application No. 19740249.8; 6 pages; dated Feb. 27, 2023.

China National Intellectual Property Administration; Notification of First Office Action issued in Application No. 201980094165.0; 28 pages; dated Aug. 26, 2023.

European Patent Office; Examination Report issued in Application No. 19740249.8, 3 pages, dated Sep. 12, 2023.

\* cited by examiner

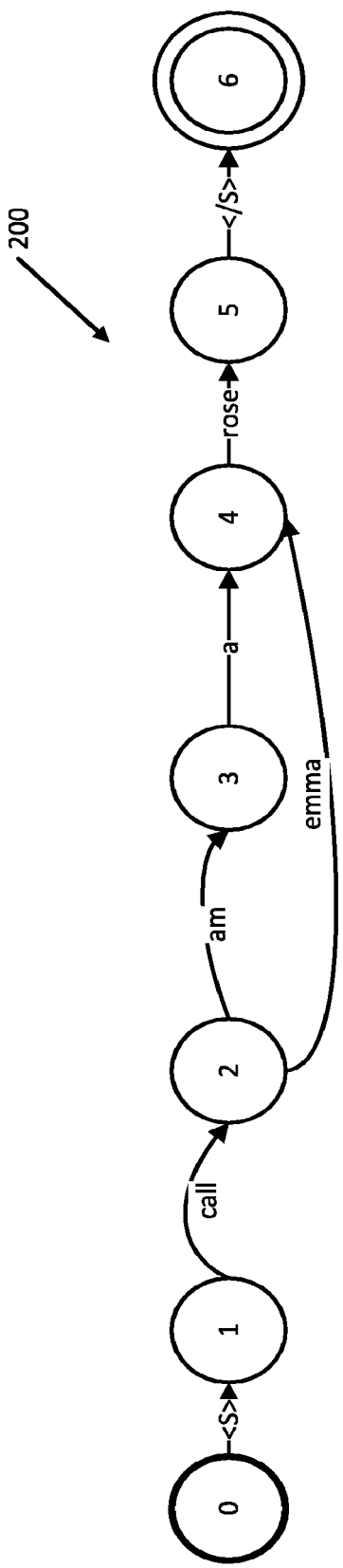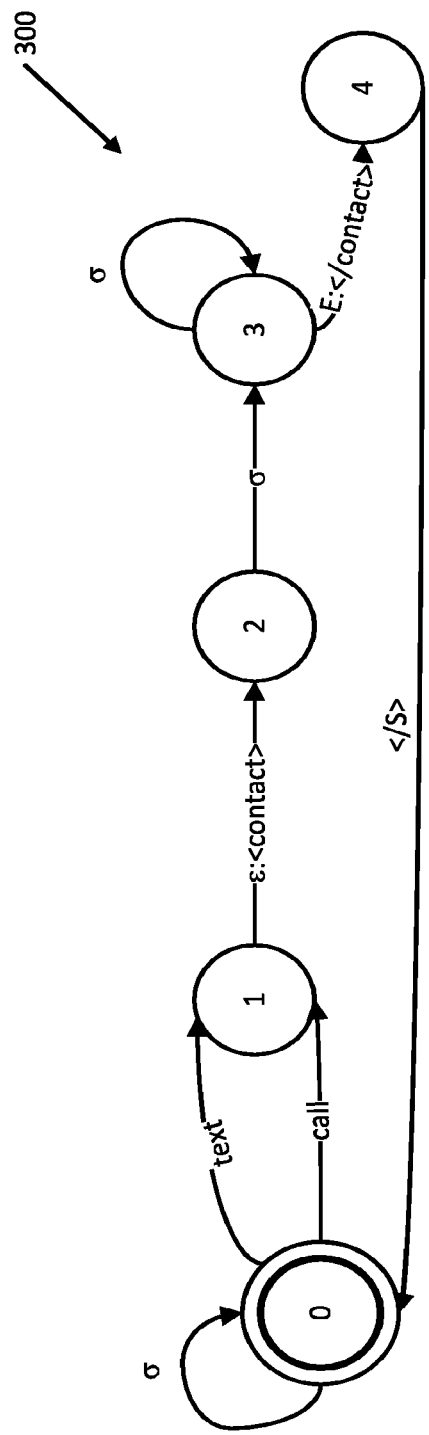
FIG. 2
FIG. 3

WORD LATTICE AUGMENTATION FOR AUTOMATIC SPEECH RECOGNITION

BACKGROUND

Automatic speech recognition (ASR) techniques convert natural language input into text. For example, audio data captured using a microphone can be converted into text. ASR systems can include a first-pass decoder portion that searches through a space of hypotheses and produces a set of candidate recognitions of captured audio data, and a second-pass rescorer portion that selects generated text from the set of candidate recognitions.

Humans may engage in human-to-computer dialog with interactive software applications referred to herein as "automated assistants" (also referred to as "digital agents", "chatbots", "interactive personal assistants", "intelligent personal assistants", "assistant applications", "conversational agents", etc.). For example, humans (which when they interact with automated assistants may be referred to as "users") may provide commands and/or requests to an automated assistant using spoken natural language input (i.e., utterances), which may in some cases be converted into text (e.g., converted into text using ASR techniques) and then processed.

SUMMARY

Implementations described herein are directed towards determining a text representation of captured audio data containing contextually relevant named entities. Named entities (NEs) can include one or more locations, events, people, and/or additional entities. In many implementations, a named entity engine can be utilized to augment candidate recognitions of captured audio data generated by a first-pass decoder portion of an ASR engine. An ASR system can include a first-pass decoder and a second-pass rescorer. The first-pass decoder can determine a set of candidate recognitions of the captured audio. In many implementations, this set of candidate recognitions can be represented as a word lattice (i.e., an acyclic graph containing candidate recognitions of the captured audio data). The second-pass rescorer can select a candidate recognition as the text representation of the captured audio data. A NE engine in accordance with implementations described here can be used to determine additional or alternative candidate recognition(s) of contextually relevant named entities based on the word lattice generated by the first-pass decoder. In many implementations, the NE engine can process the alternative candidate recognition(s) of the contextually relevant named entities to determine a likelihood the alternative candidate recognition(s) are captured in the audio data. Similarly, the second-pass rescorer can process the set of candidate recognitions generated using the first-pass decoder to determine the likelihood the set of candidate recognitions are captured in the audio data. The most likely recognition can be selected as the text corresponding to the captured audio data. In many implementations, the NE engine and the second-pass rescorer can process the word lattice generated using the first-pass decoder in parallel. Additionally or alternatively, the NE engine can process the word lattice prior to the second-pass rescorer or after the second pass-rescorer.

First-pass decoders typically excel at recognizing common words that may indicate the presence of NEs nearby. When first-pass decoders fail to recognize a NE, they are likely to mistake it for word sequences that are phonetically close. For example, a user can speak "Please play Wall-E on my TV". An ASR decoder is likely to correctly recognize "please play" and "on my TV". In many implementations, the decoder fails to recognize the NE "Wall-E", but is likely to propose a phonetically close candidate recognition of "Wally". These attributes of ASR systems can be leveraged by named entity engine(s) to augment a word lattice with additional and/or alternative candidate recognitions. In many implementations, NE engine can identify an augmentation location which is a span in the ASR word lattice likely to identify NEs based on carrier phrases. A carrier phrase is a sequence of word(s) and/or placeholder non-terminal token(s) indicating the possibility of a NE. Named entity types can include: a song, a contact, a playlist, a location, a calendar event, a software application, and/or an additional named entity type(s). For example, a sub-path of the word lattice can be surrounded with an opening tag to its left (e.g., <song>) and a closing tag to its right (e.g., </song>) in addition to its untagged copy. For instance, captured audio data can include "please play 'hypothetical movie title'". The carrier phrase "play" provides an indication of the NE "hypothetical movie title". A time interval covering the phrase "hypothetical movie title" can be identified as an augmentation location.

Additionally or alternatively, NE engine can identify a phoneme lattice representation of phoneme sequences covering the augmentation location. In many implementations, phoneme sequence(s) corresponding to the candidate words in the ASR word lattice can be identified. In many implementations, phoneme sequence(s) corresponding to the time interval capturing the augmentation location can be identified. A phoneme sequence can be predicted in part based on the previously predicted phonemes. By predicting phoneme(s) for the time interval of the augmentation location and excluding the rest of the audio data, predicted phonemes will not be influenced by the phonemes of additional words in the audio data. Additionally or alternatively, similar substitution can be utilized in predicting acoustically similar phoneme sequences. Furthermore, a set of phonemes can be expanded by admitting phoneme sequences that are k edits (e.g., insertions, deletions, and/or substitutions) away from the phoneme lattice.

One or more portions of the phoneme lattice can be matched with the phoneme representation of a NE associated with a user. For example, the phoneme lattice can be compared with phoneme representations of a user's contacts. When the phoneme representation of a NE is matched with a portion of the phoneme lattice, the word lattice generated using the first-pass decoder of the ASR system can be augmented with the NE in the augmentation location to generate an augmented word lattice. In other words, the matched NE can be included in the augmented word lattice as an additional candidate recognition of the audio data. In many implementations, the augmented portion of the word lattice can be processed using the NE engine, and the word lattice can be processed using the second-pass rescorer of the ASR to determine the likelihood of each candidate recognition. The text representation of the captured audio data can be selected based on the most likely recognition.

Accordingly, various implementations set forth techniques for processing audio data input to generate text representations of a contextually relevant named entity—and do so in a manner that enables speech recognition to be more efficient and/or accurate. Implementations disclosed herein increase the accuracy of textual representations of NEs captured in audio data even when the NE has a low prior probability (i.e., is infrequently encountered in the training data used to train the ASR system) or is out of vocabulary for the underlying ASR system. In these and other manners, accurate speech recognition can be performed for a given named entity without prior utilization of resources in training the ASR system on multiple (or even any) training examples that include the given named entity. Further, accurately recognizing captured audio data can conserve system resources (e.g., processor cycles, memory, battery power, and/or additional resources of a computing system) by eliminating the need for a user to repeat audio data incorrectly recognized by the system (or manually type a correction to an incorrect recognition). This shortens the duration of user input and the duration of a user-system dialog. Yet further, the user experience can be improved by eliminating the need for the user to repeat audio data incorrectly recognized by the system.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates an example word lattice generated using a first-pass decoder portion of an ASR system in accordance with implementations disclosed herein.

FIG. 3 illustrates an example pattern tagging finite state transducer in accordance with implementations disclosed herein.

DETAILED DESCRIPTION

Figure 1A:
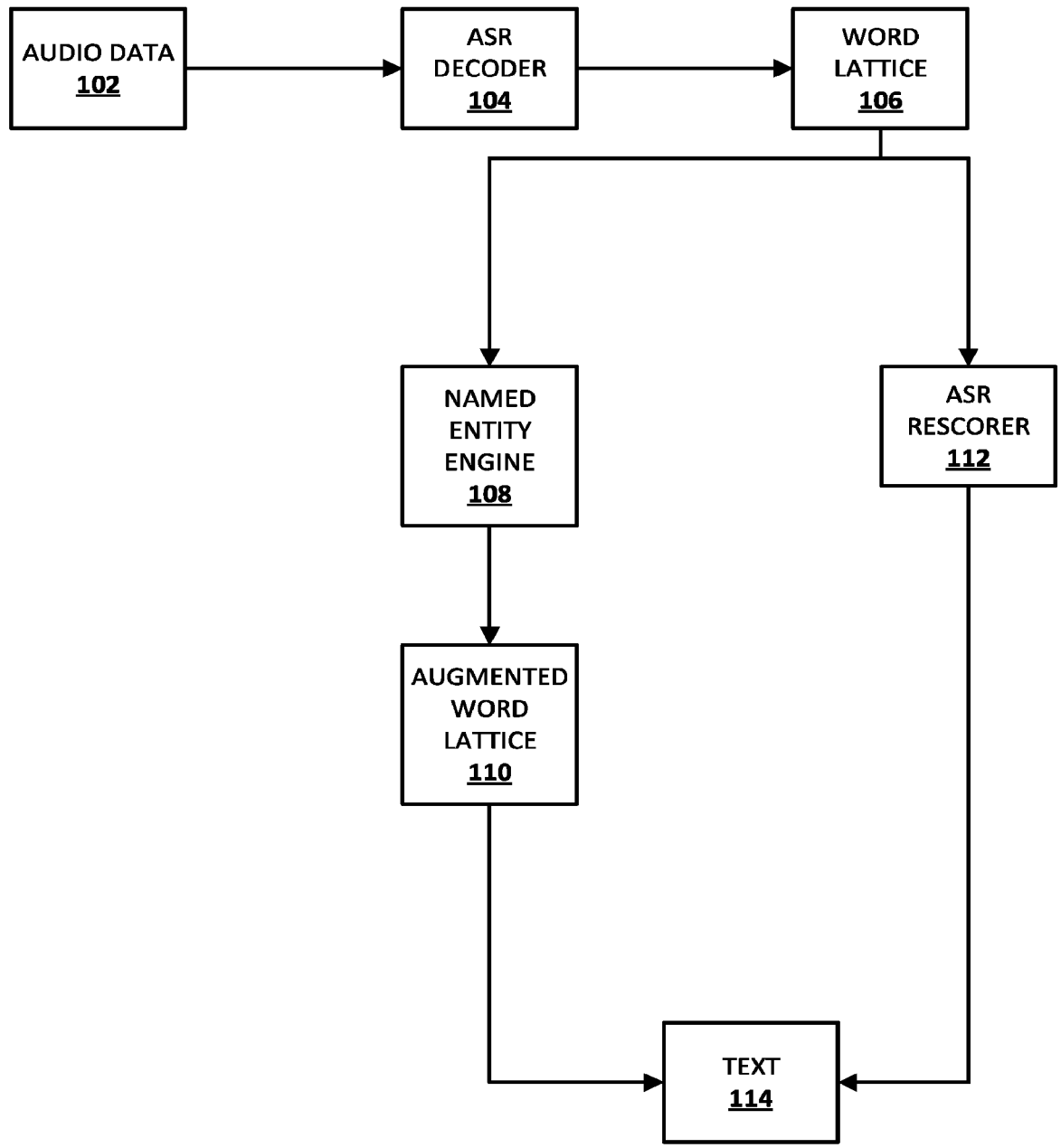
FIG. 1A illustrates an example of generating a text representation of captured audio data in accordance with various implementations disclosed herein.
Figure 11:
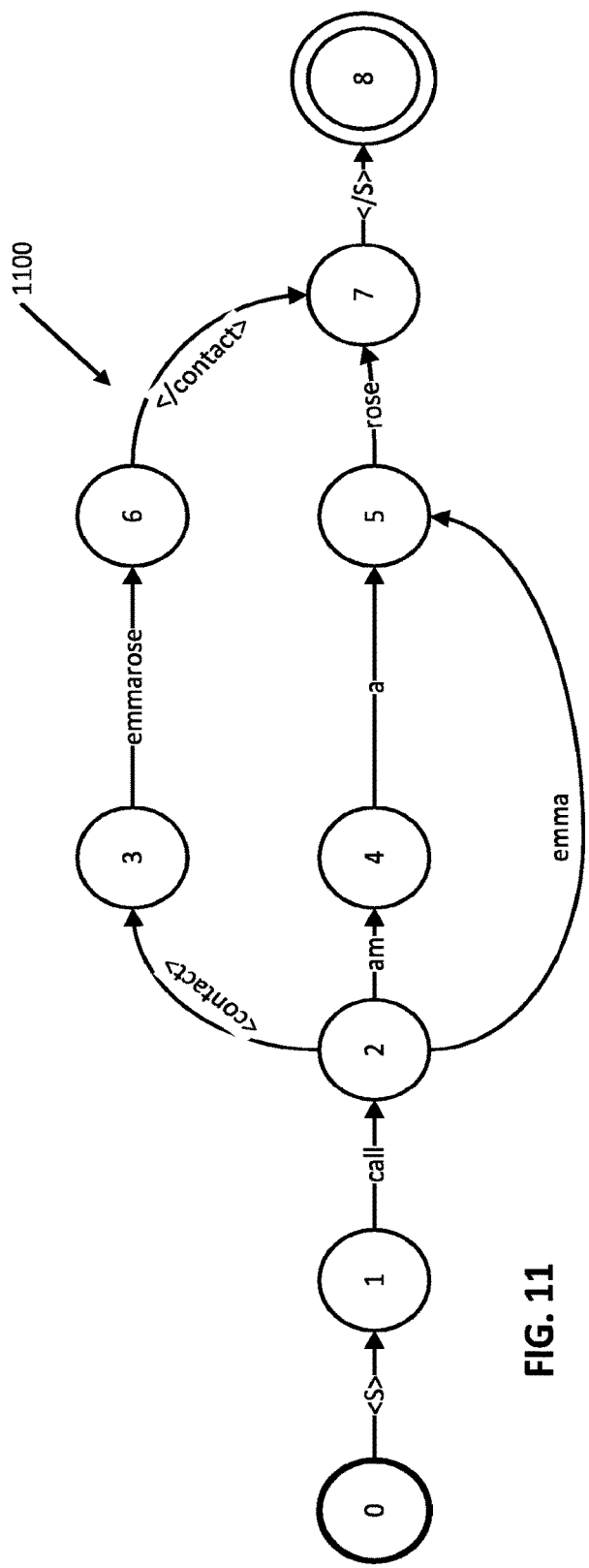
FIG. 11 illustrates an example augmented word lattice in accordance with implementations disclosed herein.

FIG. 1A illustrates an example of generating a text representation of audio data utilizing a named entity (NE) module in accordance with a variety of implementations. In the illustrated example, audio data 102 is processed using an automatic speech recognition (ASR) engine. Audio data 102 can be captured audio data such as spoken natural language captured by a microphone of a client device. The automatic speech recognition engine can include a decoder portion 104 as well as a rescorer portion 112. In many implementations, the ASR engine can be a large-vocabulary continuous speech recognition system comprising two passes: a first-pass decoder portion 104 and a second-pass rescorer portion 112. The decoder portion 104 can be used to generate a set of candidate recognitions of the audio data. In many implementations, these candidate recognitions are represented as a word lattice 106. A variety of first-pass decoder portions may be utilized including a finite state transducer (FST), a sequence-to-sequence neural network model, and/or additional first-pass portions which can produce a set of candidate recognitions of the audio data represented as a word lattice. A word lattice is a directed acyclic graph, where each distinct path is a candidate text representation of the audio data. FIG. 2 illustrates an example word lattice 200 corresponding to the captured audio data of "call emma rose". The rescorer portion 112 can select the mostly likely text representation of the audio data from the word lattice 106 generated by the first-pass of the ASR engine. In a variety of implementations, NE engine 108 can be used to process the word lattice 106 generated using the ASR decoder portion 104 to generate an augmented word lattice 110. Named entity engine 108 can improve the recognition of contextually relevant named entities (NEs) that otherwise have a low prior probability or are out of vocabulary for the underlying ASR engine. Augmented word lattice 110 can include additional or alternative candidate recognitions of named entities. FIG. 11 illustrates an augmented word lattice 1100 corresponding to word lattice 200 of FIG. 2. Named entity engine 108 can additionally and/or alternatively process the augmented word lattice to determine the most likely named entity candidate recognition of the text representation of the audio data. This can be compared with the most likely text recognition of the captured audio data determined using ASR rescorer 112 to determine the text representation of the captured audio data 114.

Figure 1B:
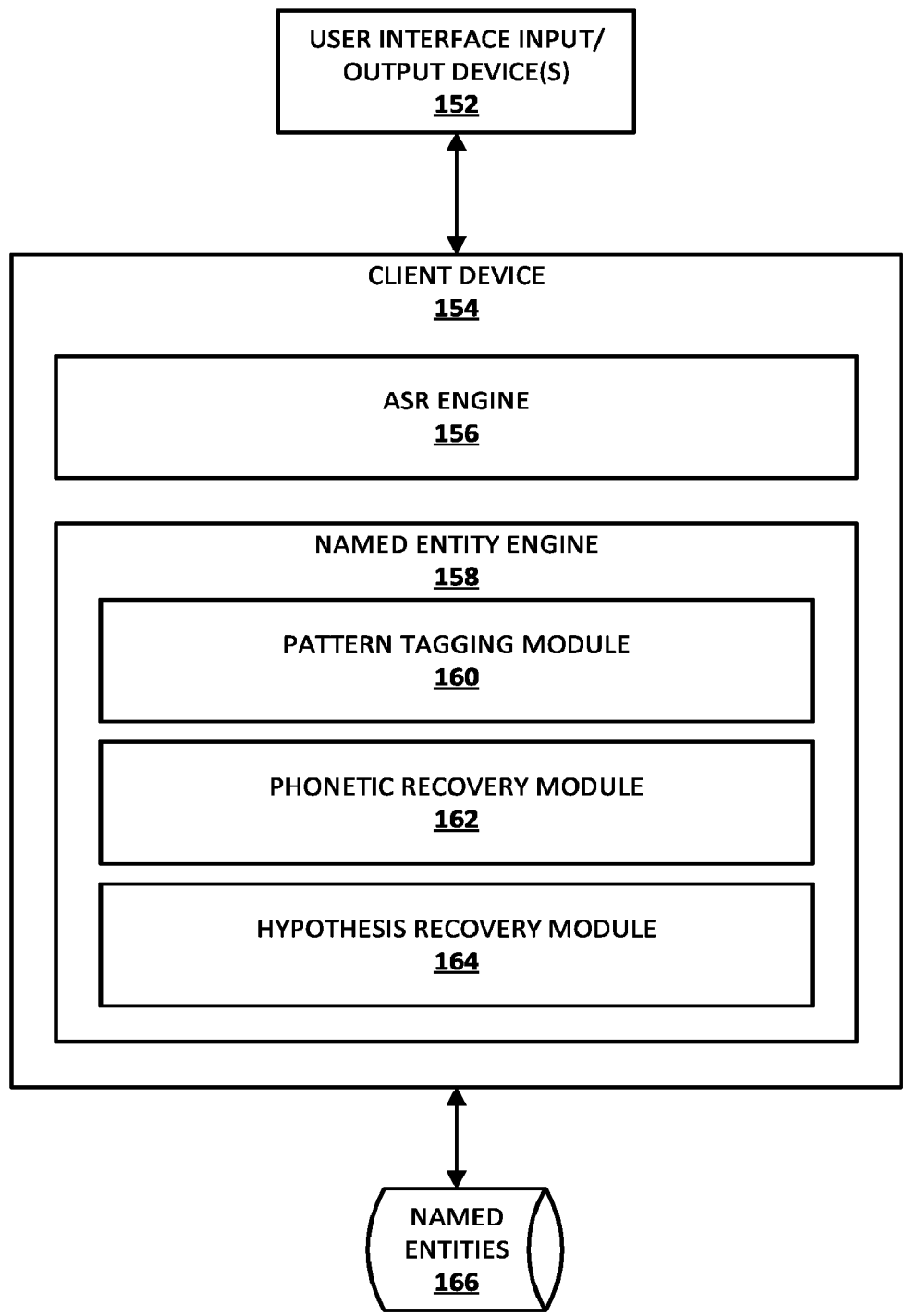
FIG. 1B illustrates an example environment where various implementations disclosed herein can be implemented.

FIG. 1B illustrates an example environment in which implementations disclosed herein may be implemented. The example environment of FIG. 1B includes client device 154 and one or more user interface input/output devices 152. Client device 154 can include automatic speech recognition engine 156, named entity engine 160, and/or additional or alternative engines (not depicted). In many implementations, named entity engine 158 can include pattern tagging module 160, phonetic recovery module 162, hypothesis recovery module 164, and/or additional or alternative engines (not depicted). Additionally or alternatively, client device 154 may be associated with named entities 166. In many implementations, named entities 166 can include named entities and phoneme lattices corresponding with the pronunciation of the named entities. Furthermore, named entities 166 can be associated with a user profile associated with client device 154. Named entities 166 can be stored locally on a client device and can be used by one or more engines to determine an augmented word lattice locally at the client device. In many implementations, storing and processing named entities 166 locally on the client device can give a user additional control over named entities associated with their user profile by eliminating the need to transmit the named entities to a shared computing device remote from the client device.

The user interface input/output devices 152 may include, for example, a physical keyboard, a touch screen (e.g., implementing a virtual keyboard or other textual input mechanism), a microphone, a camera, a display screen, and/or speaker(s). The user interface input/output devices 152 may be incorporated with one or more client devices 154 of a user. For example, a mobile phone of the user may include the user interface input/output devices 154; a stand-alone personal assistant hardware device may include the user interface input/output devices 152; or a first computing device may include the user interface input device(s) 152 and a separate computing device may include the user interface output device(s) 152; etc.

Although client device 154 is illustrated in FIG. 1B as separate from the user interface input/output devices 152, in some implementations, all or aspects of client device 154 may be implemented on a client device that also contains the user interface input/output device(s) 152. In some implementations, client device 154 may include an automated assistant (not depicted), and all or aspects of the automated assistant may be implemented on computing device(s) that are separate and remote from the client device that contains the user interface input/output device(s) 152 (e.g., all or aspects may be implemented "in the cloud"). In some of those implementations, those aspects of the automated assistant may communicate with the computing device via one or more networks such as a local area network (LAN) and/or a wide area network (WAN) (e.g., the internet).

Some non-limiting examples of client device 154 that may include the user interface input/output device(s) 152 include one or more of: a desktop computing device, a laptop computing device, a standalone hardware device at least in part dedicated to an automated assistant, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided.

Client device 154 may include one or more memories for storage of data and software applications, one or more processors for accessing data and executing applications, and other components that facilitate communication over a network. The operations performed by client device 154 may be distributed across multiple computing devices. For example, computing programs running on one or more computers in one or more locations can be coupled to each other through a network.

As illustrated in FIG. 1B, client device 154 can process audio data using ASR engine 156 and named entity engine 158 to generate a predicted text representation of the audio data. In many implementations, ASR engine 156 can include a first-pass decoder portion as well as a second-pass rescorer portion. In many implementations, the first pass-decoder portion can generate a set of candidate recognitions of the audio data represented as a word lattice. The second-pass rescorer portion can select the most likely text representation of a set of candidate recognitions. In many implementations, the second-pass rescorer portion can select the most likely text representation from an augmented word lattice generated using named entity engine 158.

Named entity engine 158 can process the word lattice generated using the first-pass decoder portion of ASR engine 156 to generate an augmented word lattice which includes a set of additional candidate recognitions of contextually relevant named entities. In various implementations, named entity engine 158 can include pattern tagging module 160, phonetic recovery module 162, and hypothesis recovery module 164. Pattern tagging module 160 can be used to identify portion(s) of the word lattice generated by the first-pass decoder that are likely to contain a NE. Additionally or alternatively, phonetic recovery module 162 can be utilized to construct hypotheses of spoken phonemes over the time intervals identified by the pattern tagging module 160 as spans likely to contain a NE. Furthermore, hypothesis recovery module 164 can match known NEs with hypotheses of spoken phonemes identified using phonetic recovery module 162, and can generate an augmented word lattice which includes the additional hypotheses of the matched NEs. Additionally or alternatively, named entity engine 158 can process the augmented portion of the word lattice to select the most likely text representation of the audio data.

FIG. 2 illustrates a word lattice 200 generated using a first-pass decoder portion of an ASR system in accordance with implementations disclosed herein. Word lattice 200 is an acyclic directed graph, where each path represents a candidate recognition of audio data. In many implementations, word lattice 200 is generated using a first-pass decoder portion of an ASR system. For example, word lattice 200 includes two candidate recognitions of "emma": (1) the edge representing "emma" between vertex 2 and vertex 4 represented "emma", and (2) the edge representing "am" between vertex 2 and vertex 3 and the edge representing "a" between vertex 3 and vertex 4. In the illustrated example, word lattice 200 begins with at vertex 0 and ends with vertex 6. Word lattice 200 includes a variety of additional vertices between vertex 0 and vertex 6 including vertex 1, vertex 2, vertex 3, vertex 4, and vertex 5. In the illustrated example, the edge between vertex 0 and vertex 1 represents "<S>" (i.e., a token indicating the beginning of a sentence and/or phrase in the audio data). The edge between vertex 2 and vertex 2 is represented by the candidate recognition "call". Two candidate recognitions are represented by edges between vertex 2 and vertex 4. The first candidate recognition of "emma" is represented as an edge between vertex 2 and vertex 4. Additionally or alternatively, a candidate recognition of "am" is represented as an edge between vertex 2 and vertex 3, and a candidate recognition of "a" is represented as an edge between vertex 3 and vertex 4. The edge between vertex 4 and vertex 5 is a candidate recognition of "rose". Furthermore, the edge between vertex 5 and the end vertex is a candidate recognition of "</S>" (i.e., a token indicating the end of a sentence and/or phrase in the audio data).

In many implementations, pattern tagging module 160 can utilize a pattern tagging finite state transducer (FST) to insert opening and closing tags (e.g., <contacts> . . . </contacts>) into a word lattice, where the opening and closing tags identify word spans likely to contain contextually-relevant NEs. Each tagged span can be associated with an entity type, such as song, contact, playlist, and/or additional named entity types. Given an input word lattice (such as word lattice 200 of FIG. 2), an augmented word lattice can be generated, where a sub-path of one or more words that may contain an NE is surrounded with an opening tag to its left (e.g. <song>) and a closing tag to its right (e.g., </song>) in addition to its untagged copy.

Figure 4:
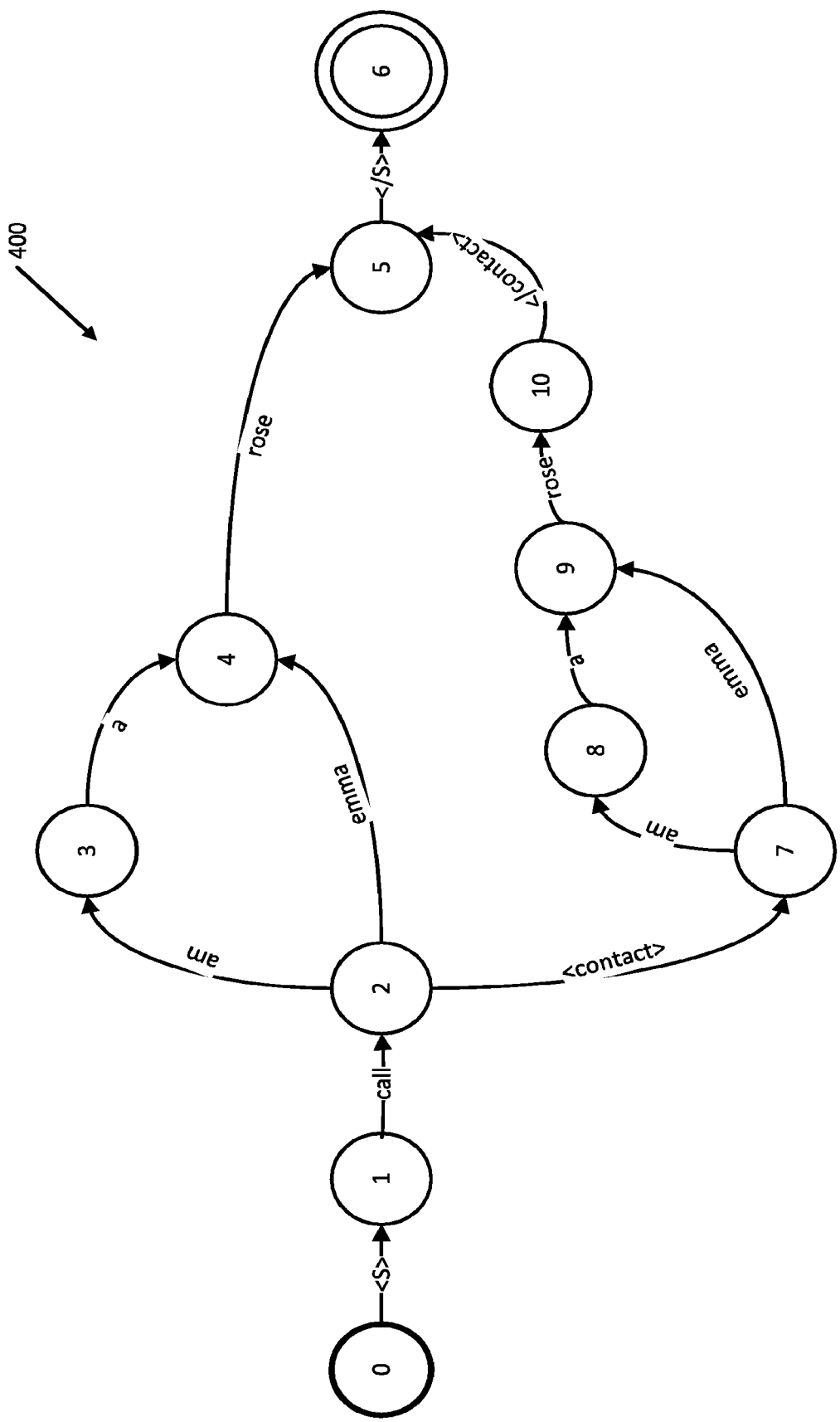
FIG. 4 illustrates an example tagged word lattice in accordance with implementations disclosed herein.

For each class type, a list of carrier phrase patterns can be aggregated that can signal the presence of a NE. A carrier phrase is a sequence of anchor words and/or placeholder non-terminal tokens representing the locations of a hypothesized NE. FIG. 3 illustrates an example pattern tagging finite state transducer (FST) 300 in accordance with many implementations. In the illustrated example, pattern tagging FST 300 can be utilized in identifying a NE contact based on presence of the carrier phrase "text" or the carrier phrase "call" in a candidate recognition of the audio data. FIG. 4 illustrates an example tagged word lattice 400 in accordance with many implementations. In the illustrated example, tagged word lattice 400 is generated by processing word lattice 200 of FIG. 2 using pattern tagging FST 300 of FIG. 3. Tagged word lattice 400 indicates spans of word lattice 200 likely to contain a contextually relevant NE, in addition to an untagged copy of the candidate word recognitions. For example, the portion of word lattice 200 following the carrier phrase "call" is duplicated and bounded by "<contact> . . . </contact>" in tagged word lattice 400.

In many implementations, phonetic recovery module 162 can be utilized to construct hypotheses of spoken phonemes over time intervals corresponding to tagged spans. These hypotheses can be represented as phoneme lattices, and can be used to search for phonetically close NEs. In many implementations, a pronunciation lexicon can be used to determine a phoneme lattice for each of the tagged paths. However, this can restrict each path to the pronunciation of words originally proposed by the ASR engine along that specific path, which may fail to recover ground truth phonemes captured in the audio data.

Figure 5:
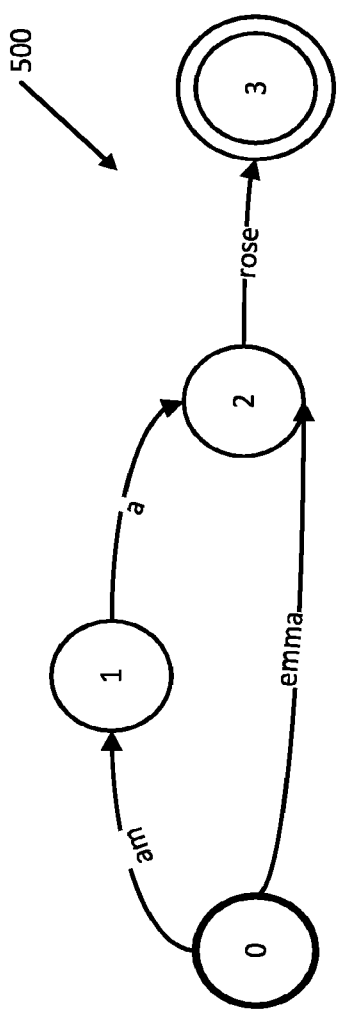
FIG. 5 illustrates an example word sub-lattice in accordance with implementations disclosed herein.
Figure 6:
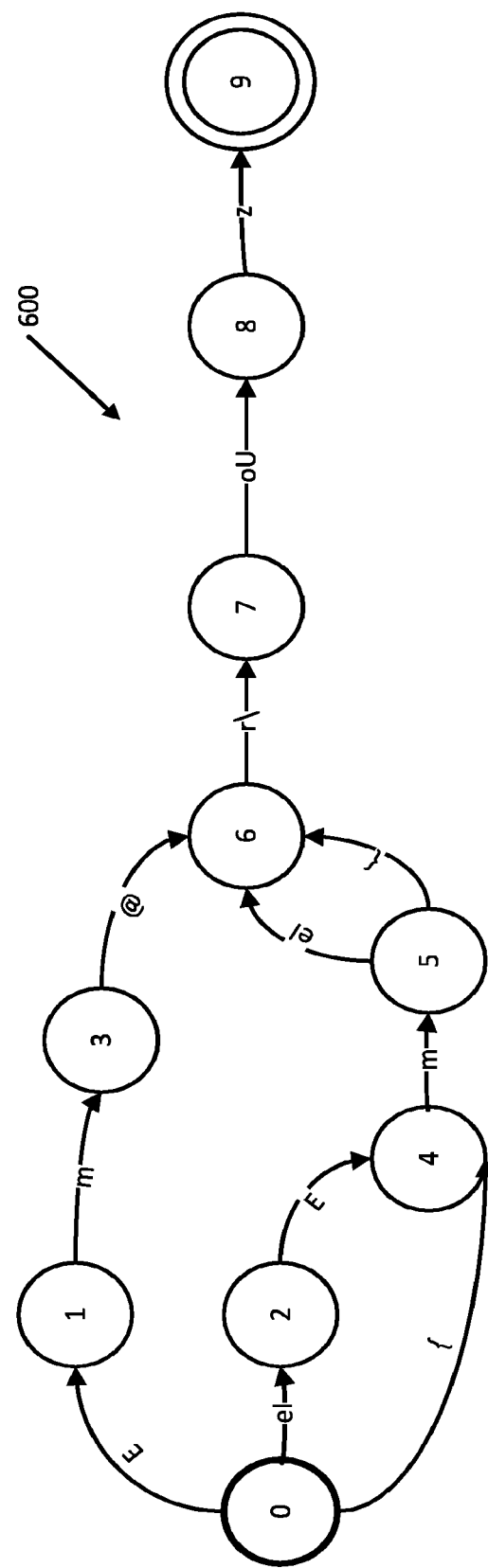
FIG. 6 illustrates an example phoneme lattice in accordance with implementations disclosed herein.

Phonetic recovery module 162 can make use of chronological time data associated with each state in a word lattice generated using the ASR engine. Instead of examining words inside a tagged path, phonetic recovery module 162 can consider the time interval bounded by the tagged path's endpoints. Any word sequences in the lattice that fill this time interval can be used to generate phoneme hypotheses. The resulting phoneme lattice can allow for more paths than the naïve approach. In other words, it may admit phoneme sequences from words outside any tagged span and/or it may admit phoneme sequences through words that are topologically disconnected in the word lattice generated using the ASR engine. FIG. 5 illustrates an example word sub-lattice 500 in accordance with many implementations. In the illustrated example, word sub-lattice 500 shows words extracted from tagged word lattice 400 of FIG. 4. FIG. 6 illustrates an example phoneme lattice 600 in accordance with many implementations. In the illustrated example, phoneme lattice 600 is generated based on the candidate recognitions captured in word sub-lattice 500 of FIG. 5. For example, phoneme lattice can include the phoneme sequence 'E' 'm' '@' representing the word lattice sequence 'am' 'a' in FIG. 5.

Figure 7:
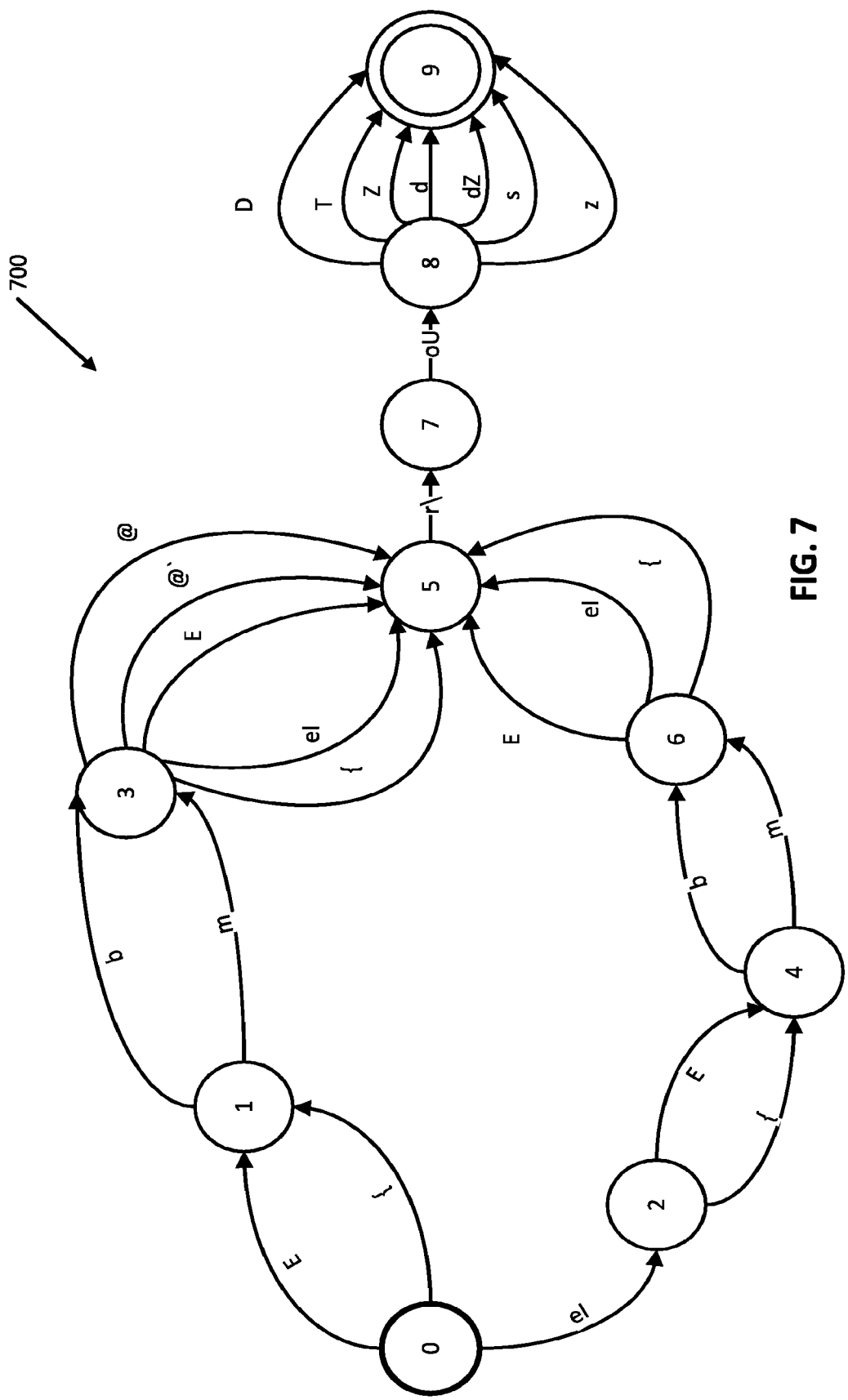
FIG. 7 illustrates an example phoneme lattice after similar phoneme substitution in accordance with implementations disclosed herein.

Even using time intervals, phoneme hypotheses can be restricted to pronunciations of words from the original word lattice, which may not contain the ground-truth phonemes captured in the audio data (particularly with sparse lattices and/or noisy audio data). In many implementations, phonetic recovery module 162 can utilize an additional FST that allows acoustically close phonemes to be substituted for one another. For example, a phoneme distance matrix can be computed over phonemes from the X-SAMPA phonetic alphabet from acoustic feature vectors determined by linguists. A $L_2$ distance can be computed between vectors, and low-distance pairs below with a distance below a threshold value can be used as substitutes. In many implementations, rules can be added for composing or decomposing diphthongs into their component vowel phonemes, and affricates into their component plosive and fricative phonemes. Additionally or alternatively, a machine learning model can be used to determine acoustically similar phonemes to be substituted for one another. FIG. 7 illustrates an example phoneme lattice 700 after similar phoneme substitution in accordance with a variety of implementations. In the illustrated example, phoneme lattice 700 is generated by processing phoneme lattice 600 of FIG. 6 using similar phoneme substitution. For example, the phoneme '@' in FIG. 6 is expanded using similar phoneme substitution to include additional similar phonemes of '@' '@'' 'E' 'el' and 'these 55' in FIG. 7.

In some implementations, similar phoneme substitution can have trouble determining ground truth phonemes in harder cases, such as those with sparsely populated word lattices and/or noisy acoustics. Phonetic recovery module 162 can expand hypotheses phonemes by admitting phoneme sequences that are k edits—insertions, deletions, and/or substitutions—away from the phoneme lattice. In many implementations, admitting phoneme sequences that are k edits can expand the phoneme space indiscriminately in all directions.

Additionally or alternatively, hypothesis recovery module 164 can be utilized in suggesting new NEs from the context based on the phonetic hypotheses lattice. For example, hypothesis recovery module 164 can be utilized in searching though NEs to match contextually-relevant NEs with the phoneme lattice generated using the phonetic recovery module. Additionally or alternatively, hypothesis recovery module 164 can augment a word lattice using the matched NEs.

Matching can be performed by composing each phoneme lattice with a specialized class-based lexicon FST. One or more contextual NEs can be identified belonging to a class. For example, given the "contacts" class for a given user, the NEs might include the first, last, and full names of the contacts in the user's address book. A lexicon FST can be constructed that transduces the pronunciation of each NE in the list of one or more NEs. In many implementations, context matching can be performed by, for each tagged time interval of the tagged word lattice, generating a match lattice containing NEs that are similar in sound to the words spoken during the time interval.

Figure 8:
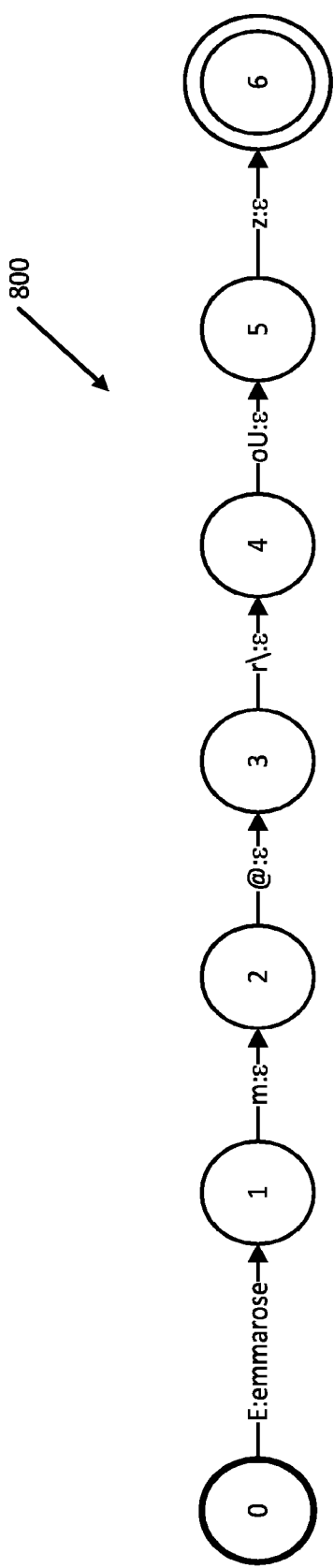
FIG. 8 illustrates an example phoneme-to-entity finite state transducer in accordance with implementations disclosed herein.
Figure 9:
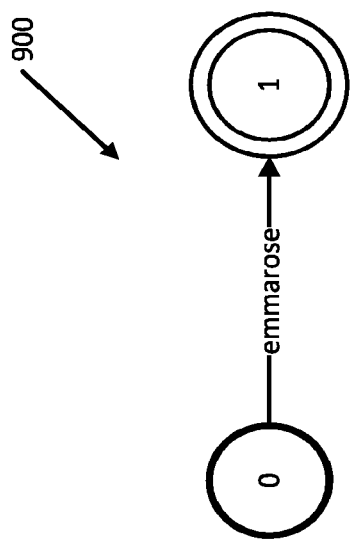
FIG. 9 illustrates an example of entity matching results in accordance with implementations disclosed herein.

FIG. 8 illustrates an example phoneme-to-entity FST 800 in accordance with many implementations. In many implementations, a phoneme lattice such as phoneme lattice 700 of FIG. 7 can be processed using a phoneme-to-entity FST such as FST 800 of FIG. 8 to generate a named entity match such as entity match results 900 of FIG. 9. In many implementations, NE matching operations with different time intervals and/or different class types can be performed in parallel.

Figure 10:
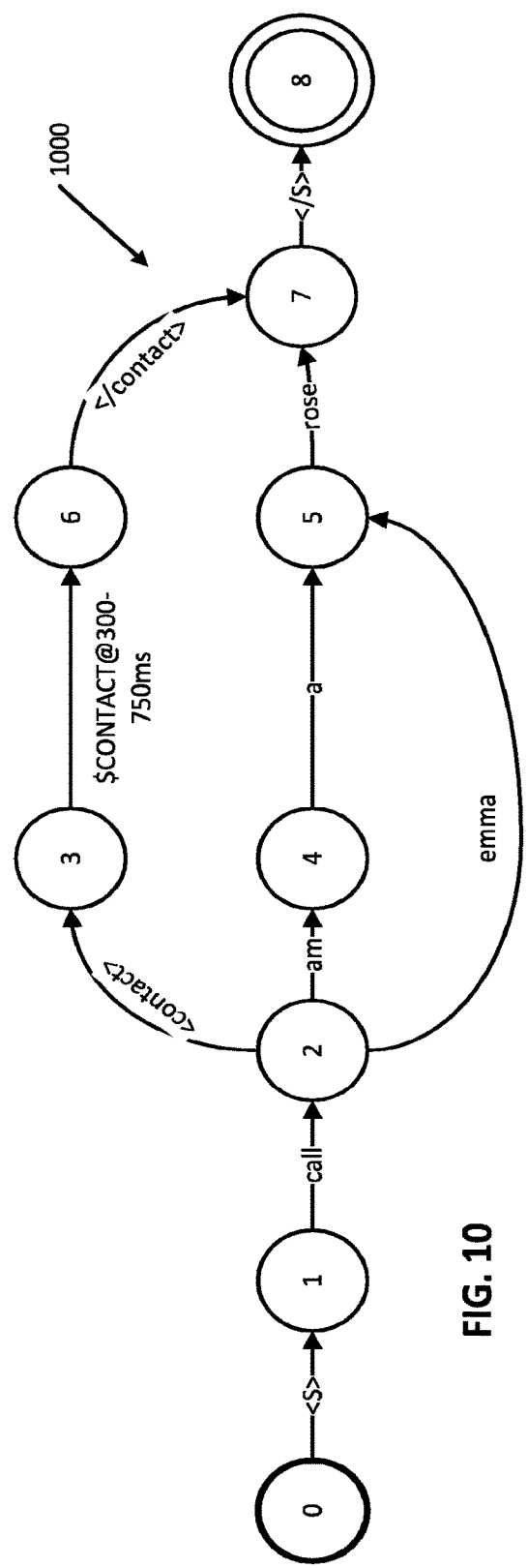
FIG. 10 illustrates a tagged word lattice indicating an augmentation location in accordance with implementations disclosed herein.

Hypothesis recovery module 164 can additionally or alternatively be utilized generating an augmented word lattice using the matched lattices for each class. Word lattice 1000 of FIG. 10 illustrates tagged word lattice 400 of FIG. 4 after the tagged time interval is replaced with a replacement arc identifying the tagged time interval. For example, the tagged portion of the tagged word lattice matching with the NE (e.g., the edges "emma" and "rose") are replaced with an indication of the tagged time interval of "$CONTACT@300-750 ms". Additionally or alternatively, FIG. 11 illustrates an example augmented word lattice 1100 where the tagged time interval identified in FIG. 10 is replaced with results of entity matching illustrated in FIG. 9. For example, the indication of the time interval "$CONTACT@300-750 ms" is replaced with the contact "emmarose".

Figure 12:
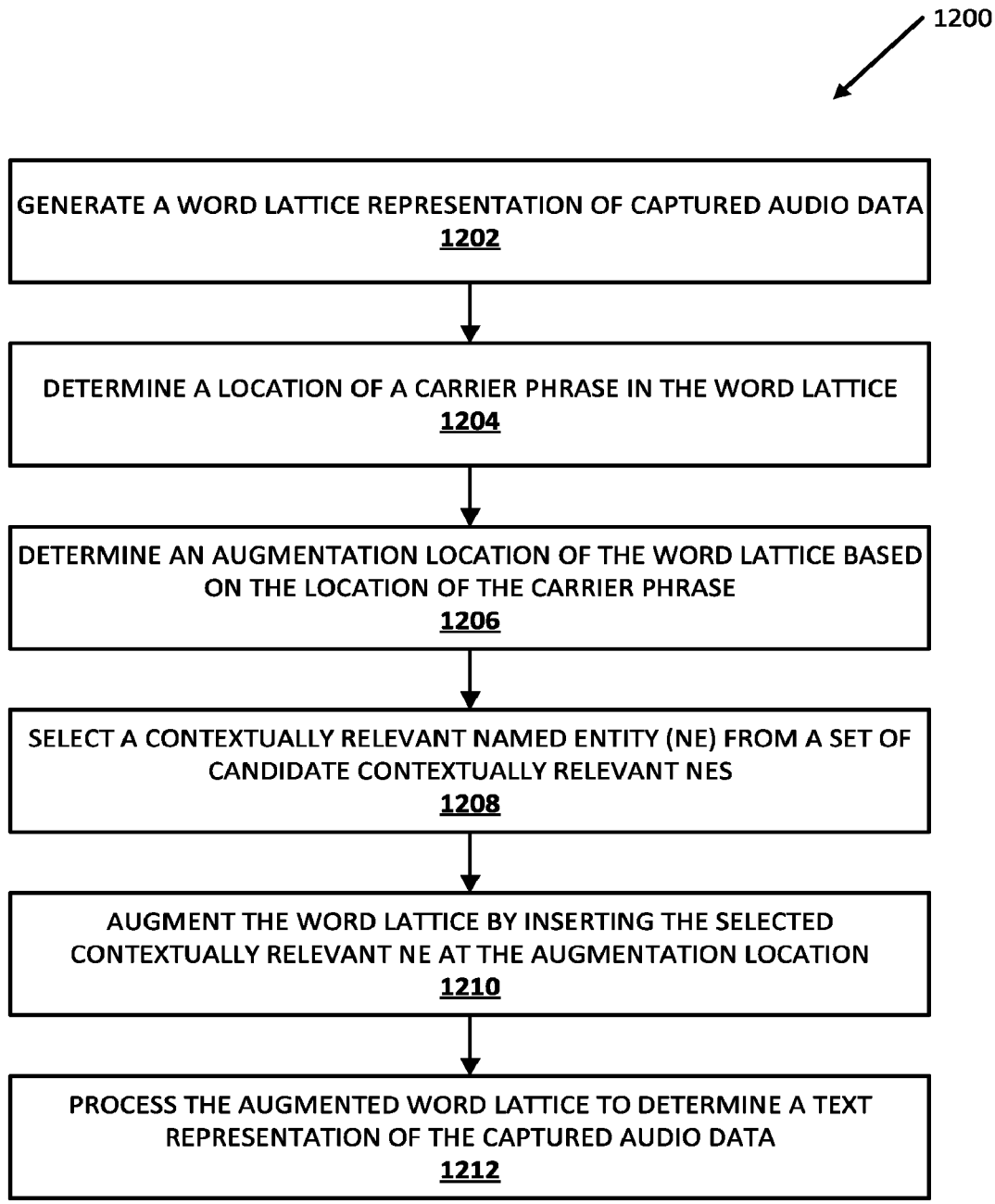
FIG. 12 is a flowchart illustrating an example process in accordance with implementations disclosed herein.

FIG. 12 is a flowchart illustrating a process 1200 of determining a text representation of a named entity in captured audio data according to implementations disclosed herein. For convenience, the operations of the flowchart are described with reference to a system that performs the operations. This system may include various components of various computer systems, such as one or more components of client device 154 of FIG. 1B. Moreover, while operations of process 1200 are shown in a particular order, this is not meant to be limiting. One or more operations may be reordered, omitted, and/or added.

At block 1202, the system generates a word lattice representation of captured audio data. In many implementations, the word lattice representation can be generated using a first-pass decoder of an ASR system. For example, word lattice 200 of FIG. 2 illustrates a word lattice generated using a first-pass decoder portion of an ASR engine.

At block 1204, the system determines a location of a carrier phrase in the word lattice. A carrier phrase. A carrier phrase is a sequence of anchor words and/or placeholder non-terminal tokens representing the locations of hypothesized NEs. For example, the carrier phrase "play" can indicate a movie NE, a song NE, and/or additional playable media NE; the carrier phrase "call" and/or the carrier phrase "text" can indicate a contact NE; etc. In many implementations, a carrier phrase can be identified using pattern tagging module 160 of FIG. 1B. A pattern tagging FST such as FST 300 of FIG. 3 can be utilized in identifying a carrier phrase.

At block 1206, the system can determine an augmentation location of the word lattice based on the location of the carrier phrase. In many implementations, pattern tagging module 160 can be used in determining the augmentation location.

At block 1208, the system can select a contextually relevant NE from a set of candidate contextually relevant NEs. In many implementations, the system can determine a set of candidate phonemes in the augmentation location. For example, the system can utilize phonetic recovery module 162 of FIG. 2 in determining a set of phonemes representing the words captured in the augmentation location; determining a set of phonemes representing the time interval of the augmentation location; determining a set of phonemes acoustically similar to a set of phonemes representing the augmentation location; determining a set of phonemes k edits away from the set of phonemes representing the augmentation location; and/or additional or alternative sets of phonemes representing the augmentation location. In many implementations, the set of determined phonemes can be compared with phoneme representations of candidate NEs. For example, a set of candidate NEs can be associated with a user profile as contextually relevant to a specific user.

At block 1210, the system augments the word lattice by inserting the selected contextually relevant NE at the augmentation location of the word lattice generated by the first-pass decoder portion of the ASR engine.

At block 1212, the system processes the augmented word lattice to determine a text representation of the captured audio data. In many implementations, the system can process the word lattice using a second-pass rescorer portion of an ASR system, and can process the augmented portion of the word lattice using the NE engine. The text representation of the captured audio data can be selected from: the candidate recognition(s) processed using the second-pass rescorer portion of the ASR system; and the augmented candidate recognition(s) processed using the NE engine.

Figure 13:
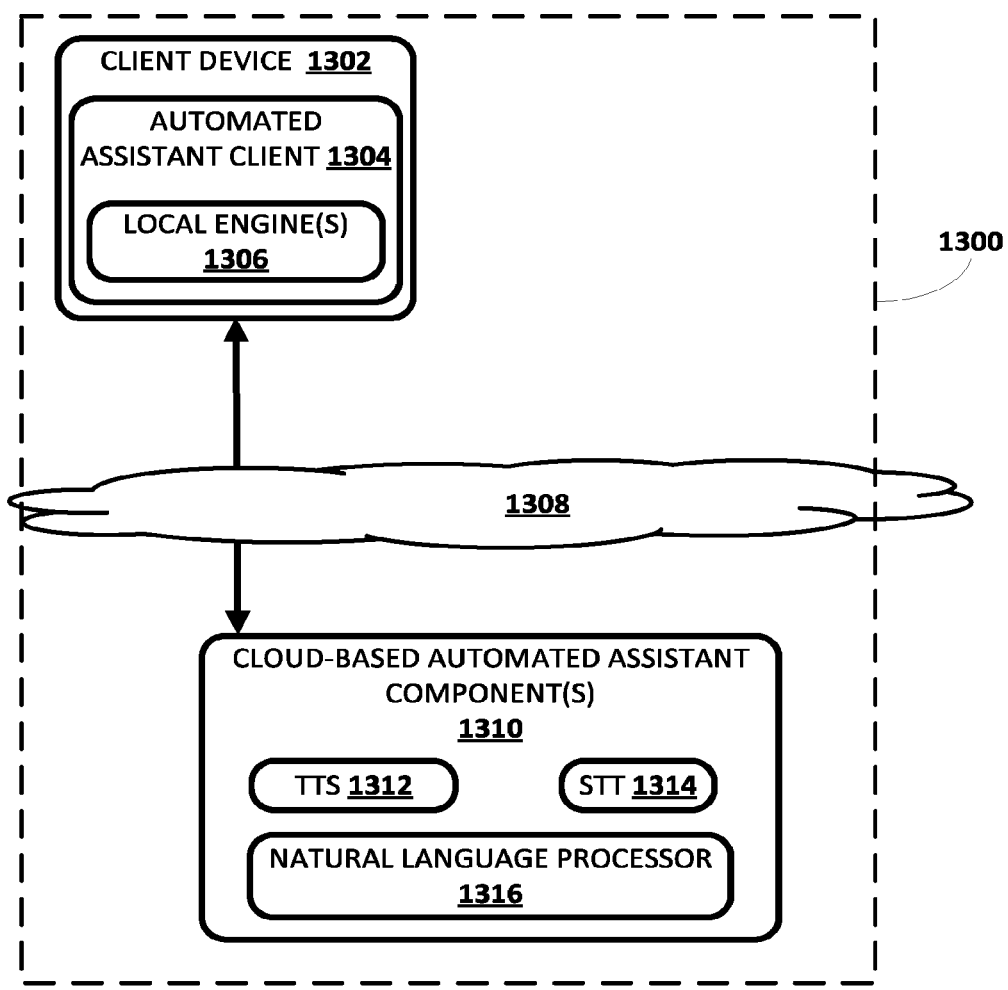
FIG. 13 illustrates another example environment in which implementations disclosed herein can be implemented.

Turning to FIG. 13, an example environment in which implementations disclosed herein can be implemented. FIG. 13 includes a client computing device 1302, which execute an instance of an automated assistant client 1304. One or more cloud-based automated assistant components 1310 can be implemented on one or more computing systems (collectively referred to as a "cloud" computing system) that are communicatively coupled to client device 1302 via one or more local and/or wide area networks (e.g., the Internet) indicated generally at 1308.

An instance of an automated assistant client 1304, by way of its interactions with one or more cloud-based automated assistant components 1310, may form what appears to be, from the user's perspective, a logical instance of an automated assistant 1300 with which the user may engage in a human-to-computer dialog. It thus should be understood that in some implementations, a user that engages with an automated assistant client 1304 executing on client device 1302 may, in effect, engage with his or her own logical instance of an automated assistant 1300. For the sakes of brevity and simplicity, the term "automated assistant" as used herein as "serving" a particular user will often refer to the combination of an automated assistant client 1304 executing on a client device 1302 operated by the user and one or more cloud-based automated assistant components 1310 (which may be shared amongst multiple automated assistant clients of multiple client computing devices). It should also be understood that in some implementations, automated assistant 1300 may respond to a request from any user regardless of whether the user is actually "served" by that particular instance of automated assistant 1300.

The client computing device 1302 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 1302 may be distributed between multiple computing devices. For example, one or more operations of client computing device 1302 may be distributed between a mobile smartphone and a vehicle computing device. Furthermore, operations of client computing device 1302 may be repeated between multiple computing devices (which in some cases may be communicatively coupled). As a further example, a mobile smartphone as well as a vehicle interface device may each implement operations of automated assistant 1300, such as a mobile smartphone and a vehicle interface device both including an invocation engine (described below). In various implementations, the client computing device 1302 may optionally operate one or more other applications that are in additional to automated assistant client 1304, such as a message exchange client (e.g., SMS, MMS, online chat), a browser, and so forth. In some of those various implementations, one or more of the other applications can optionally interface (e.g. via an application programming interface) with the automated assistant 1304, or include their own instance of an automated assistant application (that may also interface with the cloud-based automated assistant component(s) 1310).

Automated assistant 1300 engages in human-to-computer dialog sessions with a user via user interface input and output devices of the client device (not pictured). To preserve user privacy and/or to conserve resources, in many situations a user must often explicitly invoke the automated assistant 1300 before the automated assistant will fully process a spoken utterance. The explicit invocation of the automated assistant 1300 can occur in response to certain user interface input received at the client device 1302. For example, user interface inputs that can invoke the automated assistant 1300 via the client device 1302 can optionally include actuations of a hardware and/or virtual button of the client device 1302. Moreover, the automated assistant client can include one or more local engines 1306, such as an invocation engine that is operable to detect the presence of one or more spoken invocation phrases. The invocation engine can invoke the automated assistant 1300 in response to detection of one or more of the spoken invocation phrases. For example, the invocation engine can invoke the automated assistant 1300 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 1302, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 1300. As used herein, "invoking" the automated assistant 1300 can include causing one or more previously inactive functions of the automated assistant 1300 to be activated. For example, invoking the automated assistant 1300 can include causing one or more local engines 1306 and/or cloud-based automated assistant components 1310 to further process audio data frames based on which the invocation phrase was detected, and/or one or more following audio data frames (whereas prior to invoking no further processing of audio data frames was occurring).

The one or more local engine(s) 1306 of automated assistant 1304 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 1302 is relatively constrained in terms of computing resources (e.g., processor cycles, memory, battery, etc.), the local engines 1306 may have limited functionality relative to any counterparts that are included in cloud-based automated assistant components 1310.

Automated assistant client 1304 can additionally include a content agent engine (not pictured) which can be utilized by automated assistant client 1304 in accordance with a variety of implementations including: generating a content agent, determining content related to a user request using a content agent, determining content using a content agent without receiving a user request, etc.

Cloud-based automated assistant components 1310 leverage the virtually limitless resources of the cloud to perform more robust and/or more accurate processing of audio data, and/or other user interface input, relative to any counterparts of the local engine(s) 1306. Again, in various implementations, the client device 1302 can provide audio data and/or other data to the cloud-based automated assistant components 1310 in response to the invocation engine detecting a spoken invocation phrase, or detecting some other explicit invocation of the automated assistant 1300.

The illustrated cloud-based automated assistant components 1310 include a cloud-based TTS module 1312, a cloud-based STT module 1314, and a natural language processor 1316. In some implementations, one or more of the engines and/or modules of automated assistant 1300 may be omitted, combined, and/or implemented in a component that is separate from automated assistant 1300. Further, in some implementations automated assistant 1300 can include additional and/or alternative engines and/or modules.

Cloud-based STT module 1314 can convert audio data into text, which may then be provided to natural language processor 1316. In various implementations, the cloud-based STT module 1314 can convert audio data into text based at least in part on indications of speaker labels and assignments that are provided by an assignment engine (not illustrated).

Cloud-based TTS module 1312 can convert textual data (e.g., natural language responses formulated by automated assistant 1300) into computer-generated speech output. In some implementations, TTS module 1312 may provide the computer-generated speech output to client device 1302 to be output directly, e.g., using one or more speakers. In other implementations, textual data (e.g., natural language responses) generated by automated assistant 1300 may be provided to one of the local engine(s) 1306, which may then convert the textual data into computer-generated speech that is output locally.

Natural language processor 1316 of automated assistant 1300 processes free form natural language input and generates, based on the natural language input, annotated output for use by one or more other components of the automated assistant 1300. For example, the natural language processor 1316 can process natural language free-form input that is textual input that is a conversion, by STT module 1314, of audio data provided by a user via client device 1302. The generated annotated output may include one or more annotations of the natural language input and optionally one or more (e.g., all) of the terms of the natural language input. In some implementations, the natural language processor 1316 is configured to identify and annotate various types of grammatical information in natural language input. For example, the natural language processor 1316 may include a part of speech tagger (not depicted) configured to annotate terms with their grammatical roles. Also, for example, in some implementations the natural language processor 1316 may additionally and/or alternatively include a dependency parser (not depicted) configured to determine syntactic relationships between terms in natural language input.

In some implementations, the natural language processor 1316 may additionally and/or alternatively include an entity tagger (not depicted) configured to annotate entity references in one or more samples such as references to people (including, for instance, literary characters, celebrities, public figures, etc.), organizations, locations (real and imaginary), and so forth. The entity tagger of the natural language processor 1316 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 1316 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 1316 may rely on annotations from one or more other components of the natural language processor 1316. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 1316 may use related prior input and/or other related data outside of the particular natural language input to determine one or more annotations.

Figure 14:
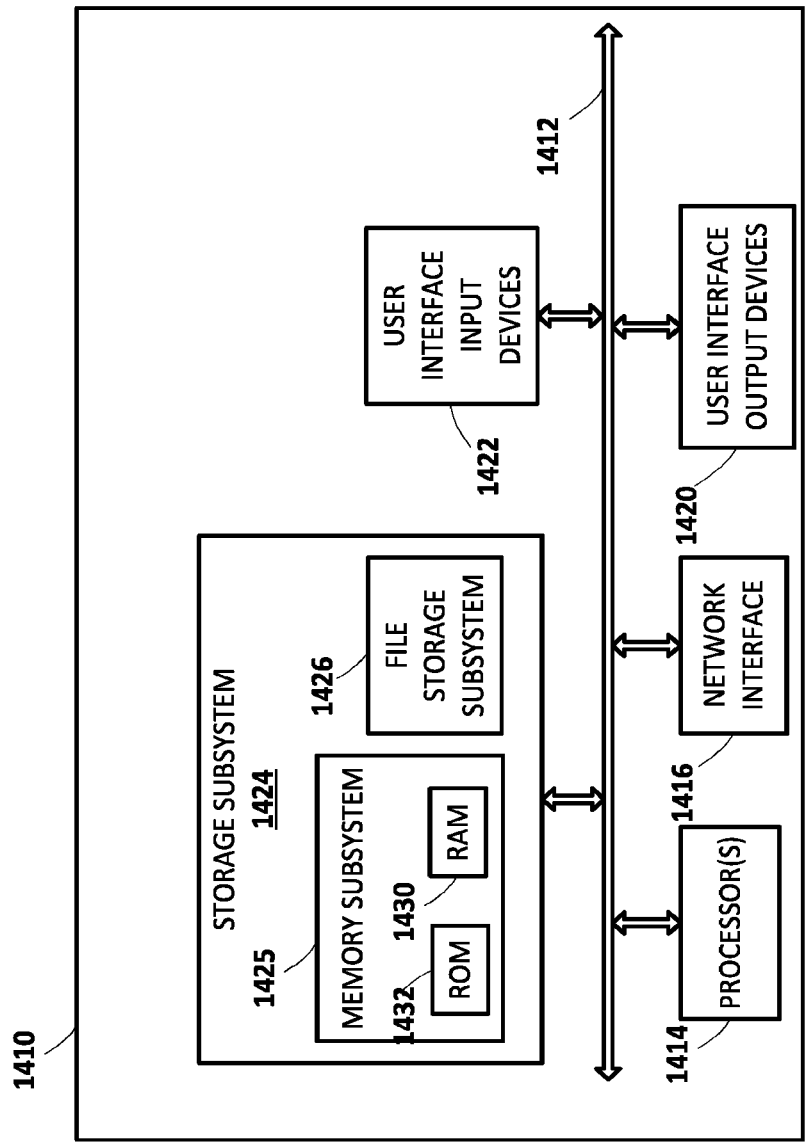
FIG. 14 illustrates an example architecture of a computing device.

FIG. 14 is a block diagram of an example computing device 1410 that may optionally be utilized to perform one or more aspects of techniques described herein. In some implementations, one or more of a client computing device, and/or other component(s) may comprise one or more components of the example computing device 1410.

Computing device 1410 typically includes at least one processor 1414 which communicates with a number of peripheral devices via bus subsystem 1412. These peripheral devices may include a storage subsystem 1424, including, for example, a memory subsystem 1425 and a file storage subsystem 1426, user interface output devices 1420, user interface input devices 1422, and a network interface subsystem 1416. The input and output devices allow user interaction with computing device 1410. Network interface subsystem 1416 provides an interface to outside networks and is coupled to corresponding interface devices in other computing devices.

User interface input devices 1422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1410 or onto a communication network.

User interface output devices 1420 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1410 to the user or to another machine or computing device.

Storage subsystem 1424 stores programming and data constructs that provide the functionality of some or all of the modules described herein. For example, the storage subsystem 1424 may include the logic to perform selected aspects of one or more of the processes of FIG. 13, as well as to implement various components depicted in FIG. 1B.

These software modules are generally executed by processor 1414 alone or in combination with other processors. Memory 1425 used in the storage subsystem 1424 can include a number of memories including a main random access memory ("RAM") 1430 for storage of instructions and data during program execution and a read only memory ("ROM") 1432 in which fixed instructions are stored. A file storage subsystem 1426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1426 in the storage subsystem 1424, or in other machines accessible by the processor(s) 1414.

Bus subsystem 1412 provides a mechanism for letting the various components and subsystems of computing device 1410 communicate with each other as intended. Although bus subsystem 1412 is shown schematically as a single bus, alternative implementations of the bus subsystem may use multiple busses.

Computing device 1410 can be of varying types including a workstation, server, computing cluster, blade server, server farm, or any other data processing system or computing device. Due to the ever-changing nature of computers and networks, the description of computing device 1410 depicted in FIG. 14 is intended only as a specific example for purposes of illustrating some implementations. Many other configurations of computing device 1410 are possible having more or fewer components than the computing device depicted in FIG. 14.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes generating a text representation of captured audio data using an automatic speech recognition engine. In some implementations, generating the text representation of the captured audio data includes generating a word lattice corresponding to the captured audio data, wherein the word lattice is an acyclic graph representing candidate recognitions of the captured audio data. In some implementations, the method includes determining, based on a location of a carrier phrase in the word lattice, an augmentation location in the word lattice. In some implementations, the method includes selecting, from a set of candidate contextually relevant named entities, a contextually relevant named entity to insert at the augmentation location of the word lattice, wherein the contextually relevant named entity is an additional candidate recognition of a portion of the captured audio data. In some implementations, the method includes augmenting the word lattice by inserting the selected contextually relevant named entity at the augmentation location. In some implementations, the method includes processing the augmented word lattice to determine the text representation of the captured audio data.

These and other implementations of the technology disclosed herein can include one or more of the following features.

In some implementations, determining, based on the location of the carrier phrase in the word lattice, the augmentation location in the word lattice includes processing the word lattice using a semantic pattern finite state transducer to determine the location of the carrier phrase in the word lattice.

In some implementations, selecting, from the set of candidate contextually relevant named entities, the contextually relevant named entity to insert at the augmentation location of the word lattice includes determining a set of candidate phoneme sequences corresponding to the word lattice at the augmentation location. In some versions of those implementations, the method further includes selecting the contextually relevant named entity by matching a phoneme representation of a candidate contextually relevant named entity in the set of candidate contextually relevant named entities with a candidate phoneme sequence in the set of candidate phoneme sequences. In some versions of those implementations, determining the set of candidate phoneme sequences corresponding to the word lattice at the augmentation location includes determining the set of candidate phoneme sequences corresponding to the word lattice at the augmentation location without determining candidate phonemes for words in the word lattice preceding the augmentation location.

In some implementations, determining the set of candidate phoneme sequences corresponding to the word lattice at the augmentation location includes, for each phoneme in the set of candidate phoneme sequences, determining whether the phoneme has one or more acoustically similar phonemes. In some versions of those implementations, in response to determining the phoneme has one or more acoustically similar phonemes, the method further includes inserting the one or more acoustically similar phonemes as one or more additional sequence paths in the set of candidate phoneme sequences.

In some implementations, determining the set of candidate phoneme sequences corresponding to the word lattice at the augmentation location includes, for each candidate phoneme sequence in the set of candidate phoneme sequences, inserting one or more edited phoneme sequences as additional sequence paths in the set of candidate phoneme sequences, where each edited phoneme sequence is a defined distance away from the candidate phoneme sequence. For example, the defined distance can include a distance of 5, a distance of 3, a distance of 2, a distance of 1, and/or additional distance(s).

In some implementations, generating the word lattice corresponding to the captured audio data includes generating the word lattice corresponding to the captured audio data using a first-pass decoding portion of the automatic speech recognition engine.

In some implementations, processing the augmented word lattice to determine the text representation of the captured audio data includes processing the augmented word lattice using a second-pass rescoring portion of the automated speech recognition engine.

In some implementations, the contextually relevant named entity is a location, an event, or a person.

In some implementations, the automatic speech recognition engine is trained using a set of training instances, and wherein the contextually relevant named entity is not in the set of training instances.

In some implementations, the automatic speech recognition engine is trained using a set of training instances, and wherein the contextually relevant named entity occurs a number of times, in the set of training instances, that is below a threshold value. For example, the threshold value can include a threshold value less than 5, a threshold value less than 3, a threshold value of 1, and/or additional threshold values.

In some implementations, the set of candidate contextually relevant named entities are associated with a user profile.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    capturing, via one or more microphones of a client device, audio data that includes a spoken utterance of a user, wherein the spoken utterance includes a command phrase portion for use in controlling the client device;
    generating a text representation of the spoken utterance, wherein generating the text representation of the spoken utterance comprises:
        generating a word lattice corresponding to the spoken utterance by processing the audio data using a first-pass portion of an automatic speech recognition ("ASR") model, where the word lattice is an acyclic graph representing candidate recognitions of the spoken utterance;
        identifying a location of a carrier phrase in the word lattice, where the carrier phrase corresponds to the command phrase portion of the spoken utterance;
        determining, based on the location of the carrier phrase in the word lattice, an augmentation location in the word lattice;
        selecting, from a set of candidate contextually relevant named entities, a contextually relevant named entity to insert at the augmentation location,
            where the contextually relevant named entity is an additional candidate recognition of a portion of the spoken utterance, and
            where selecting, from the set of candidate contextually relevant named entities, the contextually relevant named entity to insert at the augmentation location comprises:
                determining a set of candidate phoneme sequences corresponding to the word lattice at the augmentation location; and
                selecting the contextually relevant named entity by matching a phoneme representation of a candidate contextually relevant named entity in the set of candidate contextually relevant named entities with a candidate phoneme sequence in the set of candidate phoneme sequences;

augmenting the word lattice by inserting the selected contextually relevant named entity at the augmentation location; and processing the augmented word lattice using a second-pass portion of the ASR model, to generate the text representation of the spoken utterance.

2. The method of claim 1, wherein determining the set of candidate phoneme sequences corresponding to the word lattice at the augmentation location comprises:

for each phoneme in the set of candidate phoneme sequences:

determining whether the phoneme has one or more acoustically similar phonemes; and in response to determining the phoneme has one or more acoustically similar phonemes, inserting the one or more acoustically similar phonemes as one or more additional sequence paths.

3. The method of claim 1, further comprising:

determining a control command for the client device based on the command phrase and the selected contextually relevant named entity; and causing the client device to perform one or more actions based on the control command.

4. The method of claim 1, wherein the contextually relevant named entity is a name of media playable by the client device.

5. The method of claim 4, wherein the name of the media playable by the client device is stored in association with a user profile of the user.

6. The method of claim 5, wherein the media playable by the client device and stored in association with the user profile is stored at the client device.

7. A non-transitory computer-readable storage medium storing instructions executable by one or more processors of a computing system to perform a method of:

capturing, via one or more microphones of a client device, audio data that includes a spoken utterance of a user, wherein the spoken utterance includes a command phrase portion for use in controlling the client device;

generating a text representation of the spoken utterance, wherein generating the text representation of the spoken utterance comprises:

generating a word lattice corresponding to the spoken utterance by processing the audio data using a first-pass portion of an automatic speech recognition ("ASR") model, where the word lattice is an acyclic graph representing candidate recognitions of the spoken utterance;

identifying a location of a carrier phrase in the word lattice, where the carrier phrase corresponds to the command phrase portion of the spoken utterance;

determining, based on the location of the carrier phrase in the word lattice, an augmentation location in the word lattice;

selecting, from a set of candidate contextually relevant named entities, a contextually relevant named entity to insert at the augmentation location, where the contextually relevant named entity is an additional candidate recognition of a portion of the spoken utterance, and where selecting, from the set of candidate contextually relevant named entities, the contextually relevant named entity to insert at the augmentation location comprises:

determining a set of candidate phoneme sequences corresponding to the word lattice at the augmentation location; and selecting the contextually relevant named entity by matching a phoneme representation of a candidate contextually relevant named entity in the set of candidate contextually relevant named entities with a candidate phoneme sequence in the set of candidate phoneme sequences;

augmenting the word lattice by inserting the selected contextually relevant named entity at the augmentation location; and processing the augmented word lattice using a second-pass portion of the ASR model, to generate the text representation of the spoken utterance.

8. The non-transitory computer-readable storage medium of claim 7, wherein determining the set of candidate phoneme sequences corresponding to the word lattice at the augmentation location comprises:

for each phoneme in the set of candidate phoneme sequences:

determining whether the phoneme has one or more acoustically similar phonemes; and in response to determining the phoneme has one or more acoustically similar phonemes, inserting the one or more acoustically similar phonemes as one or more additional sequence paths.

9. The non-transitory computer-readable storage medium of claim 7, wherein the instructions further include:

determining a control command for the client device based on the command phrase and the selected contextually relevant named entity; and causing the client device to perform one or more actions based on the control command.

10. The non-transitory computer-readable storage medium of claim 7, wherein the contextually relevant named entity is a name of media playable by the client device.

11. The non-transitory computer-readable storage medium of claim 10, wherein the name of the media playable by the client device is stored in association with a user profile of the user.

12. The non-transitory computer-readable storage medium of claim 11, wherein the media playable by the client device and stored in association with the user profile is stored at the client device.

13. A computing device comprising:

one or more processors, and memory configured to store instructions that, when executed by the one or more processors, cause the one or more processors to perform a method that includes:

capturing, via one or more microphones of a client device, audio data that includes a spoken utterance of a user, wherein the spoken utterance includes a command phrase portion for use in controlling the client device;

generating a text representation of the spoken utterance, wherein generating the text representation of the spoken utterance comprises:

generating a word lattice corresponding to the spoken utterance by processing the audio data using a first-pass portion of an automatic speech recognition ("ASR") model, where the word lattice is an acyclic graph representing candidate recognitions of the spoken utterance;

identifying a location of a carrier phrase in the word lattice, where the carrier phrase corresponds to the command phrase portion of the spoken utterance;

determining, based on the location of the carrier phrase in the word lattice, an augmentation location in the word lattice;

selecting, from a set of candidate contextually relevant named entities, a contextually relevant named entity to insert at the augmentation location, where the contextually relevant named entity is an additional candidate recognition of a portion of the spoken utterance, and where selecting, from the set of candidate contextually relevant named entities, the contextually relevant named entity to insert at the augmentation location comprises:

determining a set of candidate phoneme sequences corresponding to the word lattice at the augmentation location; and selecting the contextually relevant named entity by matching a phoneme representation of a candidate contextually relevant named entity in the set of candidate contextually relevant named entities with a candidate phoneme sequence in the set of candidate phoneme sequences;

augmenting the word lattice by inserting the selected contextually relevant named entity at the augmentation location; and processing the augmented word lattice using a second-pass portion of the ASR model, to generate the text representation of the spoken utterance.

14. The system of claim 13, wherein determining the set of candidate phoneme sequences corresponding to the word lattice at the augmentation location comprises:

for each phoneme in the set of candidate phoneme sequences:

determining whether the phoneme has one or more acoustically similar phonemes; and in response to determining the phoneme has one or more acoustically similar phonemes, inserting the one or more acoustically similar phonemes as one or more additional sequence paths.

15. The system of claim 13, wherein the method further includes:

determining a control command for the client device based on the command phrase and the selected contextually relevant named entity; and causing the client device to perform one or more actions based on the control command.

16. The system of claim 13, wherein the contextually relevant named entity is a name of media playable by the client device.

17. The system of claim 16, wherein the name of the media playable by the client device is stored in association with a user profile of the user.

18. The system of claim 17, wherein the media playable by the client device and stored in association with the user profile is stored at the client device.

* * * * *